(12) United States Patent
Braun

(10) Patent No.: US 9,752,845 B1
(45) Date of Patent: Sep. 5, 2017

(54) LINE PULLER FOR BOWFISHING BOWS

(71) Applicant: AMS, LLC, Stratford, WI (US)

(72) Inventor: Jeff Braun, Stratford, WI (US)

(73) Assignee: AMS, LLC, Stratford, WI (US)

( * ) Notice: Subject to any disclaimer, the term of this patent is extended or adjusted under 35 U.S.C. 154(b) by 0 days.

(21) Appl. No.: 15/333,606

(22) Filed: Oct. 25, 2016

(51) Int. Cl.
| | |
|---|---|
| *F41B 5/14* | (2006.01) |
| *A01K 91/02* | (2006.01) |
| *F41B 5/10* | (2006.01) |
| *A01K 81/00* | (2006.01) |

(52) U.S. Cl.
CPC ............ *F41B 5/1488* (2013.01); *A01K 81/00* (2013.01); *A01K 91/02* (2013.01); *F41B 5/10* (2013.01); *F41B 5/105* (2013.01)

(58) Field of Classification Search
CPC ........ F41B 5/1488; A01K 81/00; A01K 91/02
USPC ...................... 124/23.1, 86; 43/19
See application file for complete search history.

(56) References Cited

U.S. PATENT DOCUMENTS

| | | | | |
|---|---|---|---|---|
| 2,918,049 A | * | 12/1959 | Stockfleth | F41B 5/1488 124/23.1 |
| 2,938,514 A | * | 5/1960 | Berg | F41B 5/1488 124/23.1 |
| 3,129,525 A | * | 4/1964 | Lewis | A01K 91/02 124/24.1 |
| 3,377,999 A | * | 4/1968 | Bennett | F41B 5/1488 124/23.1 |
| 3,412,725 A | * | 11/1968 | Hoyt, Jr. | F41B 5/1426 124/84 |
| 3,614,947 A | * | 10/1971 | Feldman | F41B 3/02 124/20.3 |
| 4,024,667 A | * | 5/1977 | Wegener | A01K 91/02 124/23.1 |
| 4,557,243 A | * | 12/1985 | Eastman, II | F41B 5/1488 124/88 |
| 4,773,179 A | * | 9/1988 | Corley | A01K 91/02 124/86 |
| 5,553,413 A | * | 9/1996 | Gannon | A01K 81/04 43/6 |
| 6,055,764 A | * | 5/2000 | Armanno, Sr. | A01K 91/02 43/19 |
| 6,526,957 B1 | * | 3/2003 | Leven | F41B 5/1426 124/89 |
| 6,802,307 B2 | * | 10/2004 | Leven | F41B 5/1426 124/89 |
| 8,434,466 B2 | * | 5/2013 | Woods, Jr. | F41B 5/14 124/86 |
| 9,220,249 B1 | * | 12/2015 | Bailey | A01K 81/04 |
| 9,423,204 B2 | * | 8/2016 | Park | F41B 5/1426 |
| 2006/0011181 A1 | * | 1/2006 | Andrews | F41B 5/1426 124/23.1 |

\* cited by examiner

*Primary Examiner* — Alexander Niconovich
(74) *Attorney, Agent, or Firm* — Boyle Fredrickson, S.C.

(57) ABSTRACT

A line puller attached to the limb adjustment bolts used for adjusting tension on high-performance bows is provided. The line puller may be shaped to facilitate capture of the line around an enlarged projection having a flared flanged that coaxes the line into an overlap configuration to cinch the line on a narrow winding portion.

17 Claims, 2 Drawing Sheets

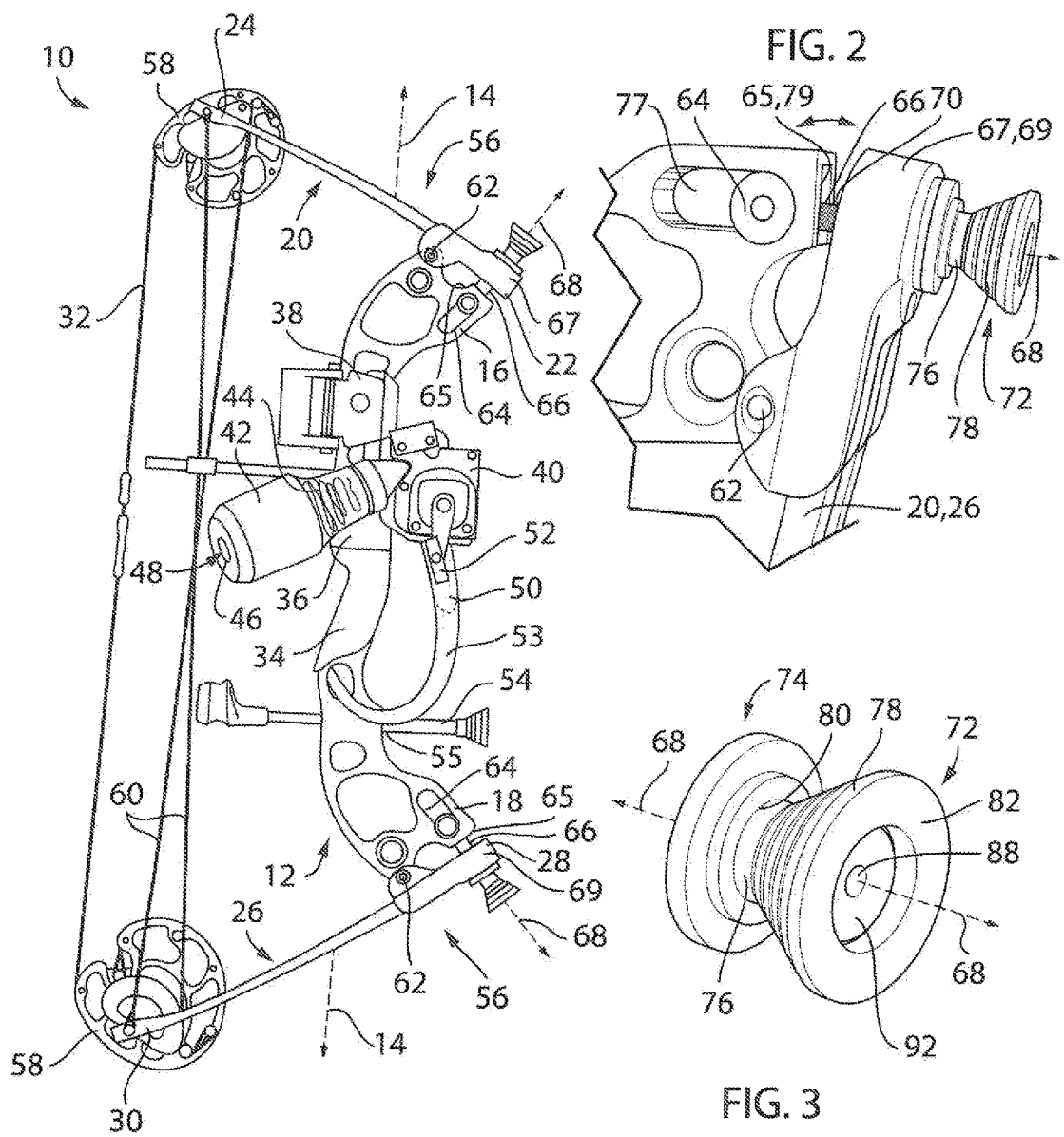

LINE PULLER FOR BOWFISHING BOWS

BACKGROUND OF THE INVENTION

The present invention relates to bowfishing devices and, more particularly, to a bowfishing line puller suitable for use with a bowfishing bow.

The sport of bowfishing involves using specialized bows and arrows to shoot and retrieve fish. In bowfishing, one end of the bowfishing line is attached to a barbed arrow so that when the arrow is shot, the line pays out allowing the arrow and fish to be retrieved by reeling the line in.

A bowfishing bow may have a lower draw weight than a standard bow as well as a constant draw to allow quick shots at moving fish and to allow snap shooting, shooting at less than full draw.

Bowfishing line is normally of greater strength than standard fishing line and often made from braided nylon, Dacron, or Spectra. The line is stored in a canister or reel mounted on the bow. A greater strength of line allows retrieval of the arrows if they become embedded in the bottom of a river or lake. In such circumstances, it is often difficult to retrieve the line which is wet and can cut into the archer's hands. To address this problem, it is known to provide bows with "line pullers" mounted on the bow riser associated with the bow stabilizer or fishing reel mounting brackets. These line pullers provide a projecting rod having a flange on one end allowing the bowfishing line to be wrapped around the line puller and then the bow as grasped by the bow fisher to be pulled in to release the arrow.

SUMMARY OF THE INVENTION

The present invention provides a bow having a line puller attached to the limb adjustment bolts used for adjusting tension on high-performance bows. This attachment point advantageously positions the line puller(s) away from the normal mounting points on the bow riser to an outer edge of the bow riser to prevent interference between the line and other features of the bow including the reel, cable guide, stabilizer and bowstrings, and yet is available in a wide range of different bow designs. In addition, force on the line puller as so positioned tends to tip the bow within its natural plane rather than twisted out of plane and possibly into the archer.

The line puller further may be shaped to facilitate capture of the line around an enlarged projection having a notched flange that coaxes the line into an overlap configuration to cinch the line on a narrow winding portion.

In one embodiment, the present invention may provide a bowfishing bow assembly having a bow riser having upper and lower ends extending along an axis and each supporting threaded screw sockets; a top limb extending at a first angle to the axis of the bow riser and having a proximal end attached to the upper end of the bow riser at a pivot point positioned inward of the proximal end to provide a cantilevered portion, the cantilevered portion supporting a screw passage for receipt of a screw passing through the cantilevered end portion to be received by the threaded screw socket of the upper end of the bow riser; a bottom limb having a proximal end opposite a distal end tipped downward from the lower end of the bow riser and attached to the bow riser at a pivot point positioned inward of the proximal end with a cantilevered end supporting a screw passage extending along a bottom screw axis; a bowstring extending between the distal ends of the top limb and the bottom limb to be tensioned by flexure of the top and bottom limbs; and a line puller attached to the cantilevered end of at least one of the top limb and bottom limb by means of a screw passing through the line puller and at least one of the screw passages of the at least one of the top and bottom limbs, the line puller providing a winding shaft extending away from the cantilevered end along the line puller axis and terminating with a line retention flange.

It is thus a feature of at least one embodiment of the invention to mount the line puller at an outer upper or lower edge of the bow frame away from bow riser components and attachments so that the bowfishing line does not tangle when being wound and pulled in. The positioning of the line puller also frees up bow riser attachment holes for other accessories.

The line puller axis may extend within a plane defined by the axis and extent of the top and bottom limbs.

It is thus a feature of at least one embodiment of the invention to prevent the force on the line being pulled in from twisting the bow around the grip.

The line puller may provide an oversized hole receiving the screw so that the screw may rotate freely within the line puller for adjustment of tension on the bowstring.

It is thus a feature of at least one embodiment of the invention to install the line puller at a natural point of attachment found on many conventional bowfishing bows and that does not interfere with normal tensioning of bow.

The retention flange provides a flare outwardly from the winding shaft as one moves away from the attachment between the line puller and the cantilevered end. The flare may extend for a majority of the length of the line puller along the line puller axis.

It is thus a feature of at least one embodiment of the invention to provide a large target for winding that nevertheless channels the line to the winding surface.

The retention flange may conform to a frustoconical projection having a narrow end attached to at least one of the top limb and bottom limb and a broad end extending distally from the narrow end. The broad end projects laterally from the line puller axis by an amount at least twice the lateral projection of the narrow end.

It is thus a feature of at least one embodiment of the invention to provide a catch area that converges downward toward the smaller winding surface.

The retention flange may be supported on a cylindrical winding shaft having a diameter equal to or less than a diameter of a cylindrical narrow end of the retention flange. The winding shaft may have a length less than 0.2 inches. The winding shaft may have a length accommodating less than four times the width of a bowfishing line.

It is thus a feature of at least one embodiment of the invention to provide a shorter and narrower wrap area requiring less length of line to be wrapped and to collect the line in an overlapping configuration on the winding shaft to lock the line.

The line puller may include notches extending circumferentially around the line puller axis. The notches may be equally spaced along the line puller axis. The notches may have a rectangular cross section. The notches may have a V-shaped cross section. The notches may have a depth of the notches is at least 0.1 inches.

It is thus a feature of at least one embodiment of the invention that the catch surface not retain the line but provide enough friction to catch the line during winding.

A distal end of the line puller may provide a countersink pocket holding a head of the screw flush therein.

It is thus a feature of at least one embodiment of the invention to prevent accidental rotation of screw which is never really fully tightened because it's an adjustment screw.

In one embodiment, the present invention may provide a line puller for winding a bowfishing line having a cylindrical winding shaft extending along an axis; a retention flange providing a flare outwardly from the shaft with a broader base extending distally from the shaft opposite a narrower base connected to the cylindrical winding shaft; and an oversized hole extending along the axis adapted to receive a bolt so that the bolt may rotate freely within the line puller.

These particular objects and advantages may apply to only some embodiments falling within the claims and thus do not define the scope of the invention.

BRIEF DESCRIPTION OF THE DRAWINGS

FIG. 1 is a side view of a bowfishing bow of the present invention illustrating a bow frame having a longitudinally extending bow riser supporting a top limb and bottom limb extending upwardly and downwardly, respectively, therefrom and having a bowstring extended between distal ends of the top limb and bottom limb;

FIG. 2 is an enlarged perspective view of a limb joint of FIG. 1 for mounting the top limb or bottom limb to the bow riser and showing a frustoconical line puller extending along an axis consistent with a bore of the top limb or bottom limb and a limb socket of the bow riser;

FIG. 3. is a top perspective view of the line puller of FIG. 1 having an inner passage extending through a height of the line puller along the axis;

DETAILED DESCRIPTION OF THE INVENTION

Figure 4:
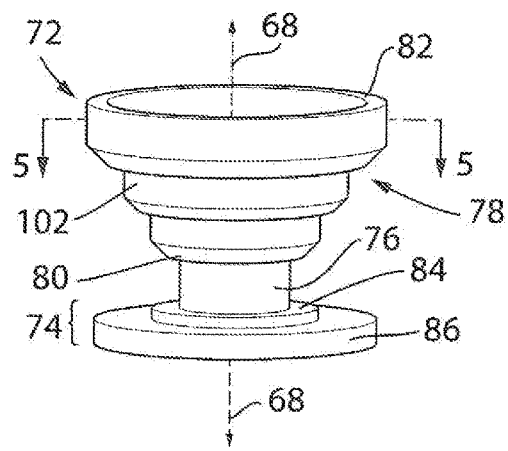
FIG. 4 is a side perspective view of the line puller of FIG. 1 having a flared catch area supported on a cylindrical wrap area.

Referring now to FIG. 1, a bowfishing bow 10 suitable for use with the present invention may include a bow riser 12 extending longitudinally along an axis 14 and having top 16 and bottom 18 ends at a respective top and bottom of the bow riser 12.

Extending rearwardly and upwardly from the top end 16 with respect to axis 14 is a top limb 20. A proximal end 22 of the top limb 20 is connected to the bow riser 12 by a pivot structure which will be described in more detail below. Similarly, extending rearwardly from the bottom end 18 and tipped downward form the bottom end 18 is a bottom limb 26 extending along a downwardly tipped angle with respect to axis 14. The bottom limb 26 is connected at a proximal end 28 to the bow riser 12 opposite a distal end 30 extending away from the bow riser 12.

The top 16 and bottom 18 ends of the bow riser 12 may be attached to the top limb 20 and bottom limb 26, respectively, at limb joints 56 securing the top limb 20 and bottom limb 26 to the bow riser 12 and allowing the curvature of the limbs to be adjusted to adjust the draw weight, as will be further explained below.

Extending substantially parallel to the bow riser 12 and strung between pulleys on the distal ends 24, 30 of the top limb 20 and bottom limb 26 is a bowstring 32 that is drawn back with an arrow to facilitate arrow flight. The pulleys may include a number of cams 58 having an eccentric, noncircular shape giving the user a mechanical advantage when shooting the arrow. In one embodiment, a dual cam system uses two rotatable cams 58 at the distal ends 24, 30 of the top limb 20 and bottom limb 26. The cams 58 are connected or slaved to one another via cables 60 to allow the cams 58 to move in synchronicity with the drawing back of the arrow. The bowstring 32 is connected at outer ends of the cams 58 such that when the bowstring 32 is drawn back the cams 58 rotate and impart force to compress the limbs 20, 26. As the cams 58 are rotated, the force required to hold the bow 10 reaches a peak and then decreases as the bow 10 reaches maximum extension, known as "let-off" allowing the user to maintain the drawn bow 10 and properly aim the arrow, as understood in the art.

In use, the bowfishing bow 10 is positioned such that the bow riser 12 is held away from the user and the bowstring 32 is positioned toward the user.

The bow riser 12 may carry a number of components permitting use of the bow 10 by a user. In one embodiment of the invention, the bow riser 12 may provide a grip 34 generally positioned below a midpoint between the top 16 and bottom 18 ends and along an inner face of the bow riser 12 receiving a palm of the user's hand with fingers gripped around the outer face of the bow riser 12 to hold the bow riser 12 upright along the axis 14. The grip 34 provides a surface that receive the fingers and thumb in opposition to grasp around the axis 14 and resist sliding of the bow riser 12 along the axis 14 through the grasp.

Above the grip 34 is an arrow rest 36 providing an upper ledge extending laterally from the bow riser 12 for supporting the cylindrical arrow shaft and keeping the arrow steady as it is being drawn back by the user.

Above the arrow rest 36, a reel mounting bracket 38 may attach a winding mechanism 40 to the bow riser 12. The winding mechanism 40 communicates with a plastic bottle 42 holding the bowfishing line 44. The bowfishing line 44 may be loosely bundled in the plastic bottle 42 with a first end of the bowfishing line 44 secured to the plastic bottle 42 such as received through an opening 46 at the bottom of the plastic bottle 42 and secured by a knot 48 unable to pass through the opening 46. The free end of the bowfishing line 44 is fed through the winding mechanism 40 allowing the bowfishing line 44 to be retrieved by pulling a downwardly extending trigger 50 backward toward the bow riser 12 which pinches the line 44 between wheels within the winding mechanism 40 (not shown) that are turned by rotating a crank handle 52 which "winds" the bowfishing line 44 by pulling the bowfishing line 44 into the plastic bottle 42. Free release of the bowfishing line 44 from the plastic bottle is permitted when the trigger 50 is not pressed. A bowfishing reel suitable for use in this purpose is described in U.S. Pat. Nos. 4,383,516 and 6,634,350 owned by the present applicant and hereby incorporated by reference.

A trigger guard 53 may be attached to the end of the trigger 50, for example having a cylindrical sleeve wrapped around the trigger 50, and extending downwardly away from the trigger 50 before bending back toward the bow riser 12 to form a "J" shape extending below the winding mechanism 40 to prevent the excess bowfishing line 44 from entering or getting caught in the trigger 50 area. The bottom end of the trigger guard 53 may be inserted into one of the lower openings in the bow riser 12 to restrict the bottom end of the trigger guard 53 from movement.

A bow stabilizer rod 54 providing a rod extending from the bow riser 12 forward along the direction of arrow flight may be optionally screwed into a threaded accessory hole 55 located in the bow riser 12 extending in the direction of the bow stabilizer rod 54 and positioned below the grip 34 of the bow riser 12. The bow stabilizer rod 54 provides additional weight to the front of the bow 10 stabilizing the bow 10, absorbing vibration force, and reducing shock to the user's hand.

As described above, the reel mounting bracket 38 may be attached to the bow riser 12 above the grip 34 by screws. Alternatively, the winding mechanism 40 may be attached to the mounting point for the stabilizer rod 54 below the grip 34 when the stabilizer is not used.

Referring now also to FIG. 2, the top end 16 and bottom end 18 of the bow riser 12 each attach pivotally, at respective pivot point 62, to respective limbs 20 and 26. The pivot point 62 is displaced inward from the proximal ends 22, 28 of the respective limbs 20 and 26 so that the proximal ends 22, 28 of the respective limbs 20 and 26 extend as cantilevered portions 67, 69 forward from the pivot point 62 over a pocket 77 supporting a bolt socket 64. The bolt socket 64 is a cylinder extending laterally through the lateral pocket 77 from a left to a right side of the bow riser 12 and provides a diametric threaded bore 79. This bore 79 is accessible through a slot 65 opening toward the cantilevered portions 67 and 69 and intersecting with the lateral pocket 77.

The bolt socket 64 is coupled to the cantilevered ends 67, 69 of the limbs 20, 26 via a limb bolt 66. The cantilevered ends 67, 69 of the limb 20, 26 over the slot 65 each have a bore 70 extending along a "line puller" axis 68 that may receive limb bolt 66 therethrough with a head 81 of the limb bolt 66 positioned at the outside of the limbs 20, 26 and a shaft 73 of the limb bolt 66 passing through the bore 70 into the slot 65 to be received threadably into the threaded bore 79.

The limb bolt 66 may be screwed into the bore 79 to pull the cantilevered ends 67, 69 of the limb 20, 26 to the bow riser 12 increasing the tension, and rotating the opposite distal end 24, 30 of the limb 20, 26 outward to raise the draw weight on the bowstring. The limb bolt 66 may be unscrewed to retract the limb bolt 66 from the bore 79 to separate the cantilevered ends 67, 69 of the limb 20, 26 from the bow riser 12, and rotating the opposite distal end 24, 30 of the limb 20, 26 inward to lower the draw weight on the bow string. In this way limb bolt 66 may be screwed and unscrewed to adjust the "draw weight" or force necessary to bring the bow 10 to full draw.

Figure 5:
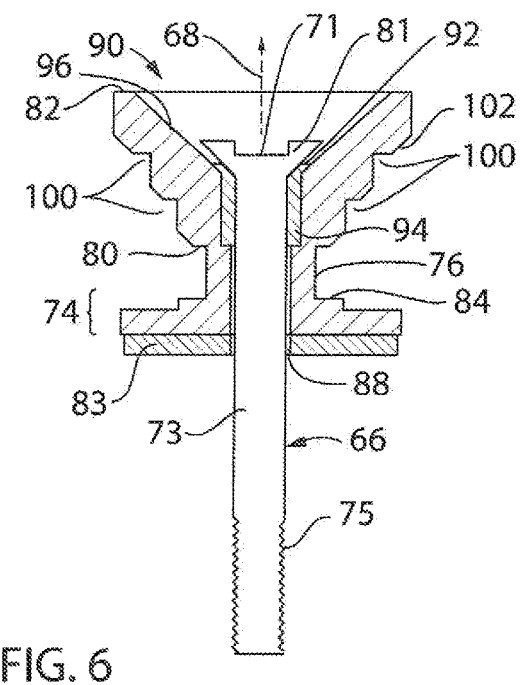
FIG. 5 is a side cross-sectional view along lines 5-5 of FIG. 4 showing the flared catch area having circumferential V-grooves and the inner passage receiving a hexagonal head screw.
Figure 6:
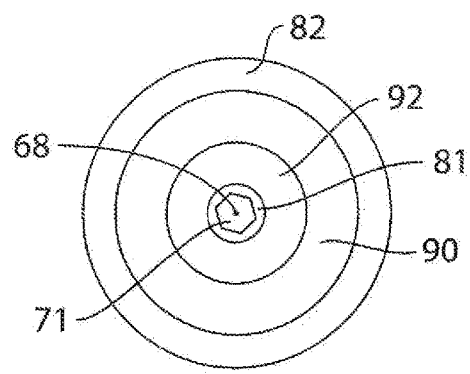
FIG. 6 is a top view of the line puller of FIG. 1.
Figure 7:
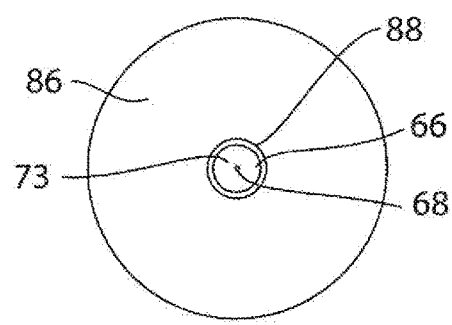
FIG. 7 is a bottom view of the line puller of FIG. 1.

Referring to FIGS. 2 through 7, extending along the axis 68 and attached to the bore 79 by the limb bolt 66 is a line puller 72 having a height of between 0.5 and 1 inch or approximately 0.7 inches along the "line puller" axis 68. The line puller 72 has a base 74 mounted to the cantilevered ends 67, 69 of the limb 20, 26 and supporting a cylindrical wrap area 76 extending upward therefrom along the axis 68. A top of the cylindrical wrap area 76 supports a frustoconical catch area 78, or a projection generally conforming to a frustum of a cone or pyramid, defined by a smaller diameter base 80 extending from the cylindrical wrap area 76 and extending outward to a larger diameter base 82 defining an upper face of the line puller 72.

The line puller 72 includes a bore 88 extending along the axis 68 and allowing the limb bolt 66 to extend therethrough. An aperture 90 accessible from the upper face of the line puller 72 may include a bushing 92 providing a sleeve 94 extending into the bore 88 with a counter-sunk hole 96 at an upper end of the sleeve 94 to allow the head 81 of the limb bolt 66 to sit flush with or below the upper face of the bushing 92, or alternatively, above the upper face of the bushing 92 but below the upper opening of the aperture 90, and to provide a bolt head 81 stop surface that prevents the limb bolt 66 from extending further through the bore 88 along axis 68. Alternatively, the hole 96 may be counter-bored providing a flat bottomed hole that may be used with a socket-head screw cap.

The base 74 of the line puller 72 may provide a two tiered cylindrical bottom having a larger diameter portion 86 underneath a smaller portion 84 and separating the line puller 72 from the limb 20, 26 surface. The larger diameter portion 86 has a height of 0.1 to 0.2 inches or approximately 0.125 inches and a diameter of 1 to 1.5 inches or approximately 1.375 inches, and the smaller portion 84 has a height of 0.02-0.03 inches or approximately 0.025 inches and a diameter of 0.5 to 1 inches or approximately 0.7 inches. The larger diameter portion 86 has a diameter that generally corresponds with the diameter of the larger diameter base 82 of the frustoconical catch area 78. A washer 83 may also be positioned between the line puller 72 and the limb 20, 26 surface having a diameter that generally corresponds with the diameter of the larger diameter portion 86 and preventing rotation of the line puller 72 (see FIG. 5).

The cylindrical wrap area 76 is centered on the smaller portion 84 and has a diameter less than the smaller portion 84. The cylindrical wrap area 76 has a height of 0.1 to 0.2 or approximately 0.135 inches or carrying 2 to 6 diameters of bowfishing line 44 side-by-side within the wrap area 76. The cylindrical wrap area 76 has a diameter of 0.5 to 1 inches or approximately 0.6 inches.

The frustoconical catch area 78 provides an exposed and enlarged outer catch surface 102 extending between the smaller diameter base 80 and larger diameter base 82 for receiving the bowfishing line 44. The smaller diameter base 80 may have a diameter approximately less than or equal to one half the diameter of the larger diameter base 82. The slope of the frustoconical catch area 78, of approximately 40-60 degrees or approximately 55 degrees, encourages a looped bowfishing line 44 to slide downward toward the smaller diameter base 80 and onto the cylindrical wrap area 76 so that the bowfishing line 44 overlaps and cinches within the catch area 78. The frustoconical catch area 78 has a height of 0.3 to 1 inches or approximately 0.4 inches providing sufficient length and area to catch the bowfishing line 44.

In one embodiment, the outer catch surface 102 of the frustoconical catch area 78 may be grooved to facilitate gripping of the bowfishing line 44 being wound around the catch area 78. The grooved outer surface may have circumferentially extending grooves 100 defined by a V-shape (see FIG. 5) or rectangular shape when viewed in cross section. The grooves 100 may be spaced apart along the outer surface such that 2 to 4 grooves extend around the catch area 78. The grooves 100 may have a depth of 0.1-0.2 inches or approximately 0.125 inches.

In one embodiment, the limb bolt 66 may be a countersunk hex head 71 screw having a smooth exterior shaft 73 with a threaded distal tip 75. In use, the limb bolt 66 may extend into the bore 88 of the line puller 72 with a countersunk head of the bolt 66 contacting and restrained from further movement along the axis 68 by the counter-sunk hole 96 of the bushing 92 within the bore 88. The limb bolt 66 may extend through the bore 88 of the line puller 72 and through the bore 70 of the cantilevered ends 67, 69 of the limbs 20, 26. The threaded tip 75 of the limb bolt 66 may extend out of the bore 70 and into the threaded bore 79 of the bow riser 12 where it is screw tighten to adjust the tightness of the attachment of the limb 20, 26 with respect to the bow riser 12.

In use, the line puller 72 may be installed on the bow 10 by aligning the bore 88 of the line puller 72 along the axis 68 of the bore 70 and bore 79 and inserting the limb bolt 66 through the bores 88, 70 and into the bore 79. The limb bolt 66 is threaded into the bore 79 to a desired depth, thus fastening the line puller 72 to the bow 10.

The user may retrieve a buried arrow by wrapping the bowfishing line 44 around the frustoconical catch area 78, allowing the outer catch surface 102 to grip the bowfishing line 44. As the user wraps the bowfishing line 44 around the frustoconical catch area 78, the line 44 falls downward toward the cylindrical wrap area 76 to encircle the wrap area 76. The bowfishing line 44 may be wrapped two or more times to overlap the line 44 within the wrap area 76 and cinch the line 44 from further sliding.

Once the bowfishing line 44 is cinched at the cylindrical wrap area 76, the user may use the bow 10 to pull the line in to dislodge the arrow from the lake or river bottom without using his or her hands. The attachment of the line puller 72 at the upper or lower limb joints 56 avoids interference of the line 44 with other bow riser 12 components and/or accessories and allows the line puller 72 to be installed with the preexisting limb bolt 66 and bore 79. Moreover, the positioning of the line puller 72 at the upper or lower ends of the bow 10 allows the user to use the weight and leverage of the bow 10 to yank the arrow out of the lake or river bottom and without twisting the bow 10 around the grip 34.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What I claim is:

1. A bowfishing bow assembly comprising:
a bow riser having upper and lower ends extending along an axis and each supporting threaded screw sockets;
a top limb extending at a first angle to the axis of the bow riser and having a proximal end attached to the upper end of the bow riser at a pivot point positioned inward of the proximal end to provide a cantilevered portion, the cantilevered portion supporting a screw passage for receipt of a screw passing through the cantilevered end portion to be received by the threaded screw socket of the upper end of the bow riser, the pivot point constraining the top limb to a range of angles with respect to the riser within a single plane for different distances of insertion of the screw in the threaded socket changing a gap between the cantilevered end portion and the upper end of the bow riser;
a bottom limb extending at a second angle to the axis of the bow riser and having a proximal end attached to the bottom end of the bow riser at a pivot point positioned inward of the proximal end to provide a cantilevered portion, the cantilevered position supporting a screw passage for receipt of a screw passing through the cantilevered end portion to be received by the threaded screw socket of the lower end of the bow riser, the pivot point constraining the bottom limb to a range of angles with respect to the riser within a single plane for different distances of insertion of the screw in the threaded socket changing a gap between the cantilevered end portion and the lower end of the bow riser;
a bowstring extending between the distal ends of the top limb and the bottom limb to be tensioned by flexure of the top and bottom limbs; and
a line puller attached to the cantilevered end of at least one of the top limb and bottom limb by means of a screw passing through the line puller and at least one of the screw passages of the at least one of the top and bottom limbs, the line puller providing a winding shaft extending away from the cantilevered end along a line puller axis and terminating with a line retention flange.

2. The assembly of claim 1 wherein the line puller provides an oversized hole receiving the screw so that the screw may rotate freely within the line puller for adjustment of tension on the bowstring.

3. The assembly of claim 2, wherein the retention flange provides a flare outwardly from the winding shaft as one moves away from the attachment between the line puller and the cantilevered end.

4. The assembly of claim 3 wherein the flare extends for a majority of a length of the line puller along the line puller axis.

5. The assembly of claim 4 wherein the retention flange conforms to a frustoconical projection having a narrow end attached to the at least one of the top limb and bottom limb and a broad end extending distally from the narrow end.

6. The assembly of claim 5 wherein the broad end projects laterally from the line puller axis by an amount at least twice the lateral projection of the narrow end.

7. The assembly of claim 6 wherein the retention flange is supported on a cylindrical winding shaft having a diameter equal to or less than a diameter of a cylindrical narrow end of the retention flange.

8. The assembly of claim 7 wherein the winding shaft has a length less than 0.2 inches.

9. The assembly of claim 7 wherein the winding shaft has a length accommodating less than four times a width of a bowfishing line.

10. The assembly of claim 4 wherein the line puller includes notches extending circumferentially around the line puller axis.

11. The assembly of claim 10 wherein the notches are equally spaced along the line puller axis.

12. The assembly of claim 11 wherein the notches have a rectangular cross section.

13. The assembly of claim 11 wherein the notches have a V-shaped cross section.

14. The assembly of claim 11 wherein a depth of the notches is at least 0.1 inches.

15. The assembly of claim 4 wherein a distal end of the line puller provides a countersink pocket holding a head of the screw flush therein.

16. A line puller for winding a bowfishing line comprising:
- a cylindrical winding shaft extending between a top and a bottom of the shaft along an axis;
- a retention flange provides a flare outwardly from the top of the shaft with a broader end extending distally from the shaft and a narrower end coupled to the shaft;
- a flange extending from the bottom of the shaft and projecting laterally from the axis an amount greater than the lateral projection of the shaft; and
- an oversized hole extending along the axis adapted to receive a bolt so that the bolt may rotate freely within the line puller;
- wherein the flare extends for a majority of a length of the line puller along the line puller axis to provide a diameter that increases without decreasing as the flare moves from the narrower end to the broader end of the retention flange; and
- wherein the cylindrical winding shaft has a maximum diameter equal to or less than a smallest diameter of the retention flange.

17. A bowfishing bow assembly comprising:
- a bow riser having upper and lower ends extending along an axis and each supporting threaded screw sockets;
- a top limb extending at a first angle to the axis of the bow riser and having a proximal end attached to the upper end of the bow riser at a pivot point positioned inward of the proximal end to provide a cantilevered portion, the cantilevered portion supporting a screw passage for receipt of a screw passing through the cantilevered end portion to be received by the threaded screw socket of the upper end of the bow riser, the pivot point constraining the top limb to a range of angles with respect to the riser within a single plane for different distances of insertion of the screw in the threaded socket changing a gap between the cantilevered end portion and the upper end of the bow riser;
- a bottom limb extending at a second angle to the axis of the bow riser and having a proximal end attached to the bottom end of the bow riser at a pivot point positioned inward of the proximal end to provide a cantilevered portion, the cantilevered position supporting a screw passage for receipt of a screw passing through the cantilevered end portion to be received by the threaded screw socket of the lower end of the bow riser, the pivot point constraining the bottom limb to a range of angles with respect to the riser within a single plane for different distances of insertion of the screw in the threaded socket changing a gap between the cantilevered end portion and the lower end of the bow riser;
- a bowstring extending between the distal ends of the top limb and the bottom limb to be tensioned by flexure of the top and bottom limbs; and
- a line puller attached to the cantilevered end of at least one of the top limb and bottom limb by means of a screw passing through the line puller and at least one of the second pivot points of the at least one of the top and bottom limbs, the line puller providing
  - a winding shaft extending away from the cantilevered end along a line puller axis and terminating with a line retention flange providing a flare outwardly from the top of the shaft with a broader end extending distally from the shaft and a narrower end coupled to the shaft;
  - a flange extending from the bottom of the shaft and projecting laterally from the axis an amount greater than the lateral projection of the shaft; and
  - an oversized hole extending along the axis adapted to receive a bolt so that the bolt may rotate freely within the line puller;
  - wherein the flare extends for a majority of a length of the line puller along the line puller axis to provide a diameter that increases without decreasing as the flare moves from the narrower end to the broader end of the retention flange; and
  - wherein the cylindrical winding shaft has a maximum diameter equal to or less than a smallest diameter of the retention flange.

\* \* \* \* \*